UNITED STATES PATENT OFFICE.

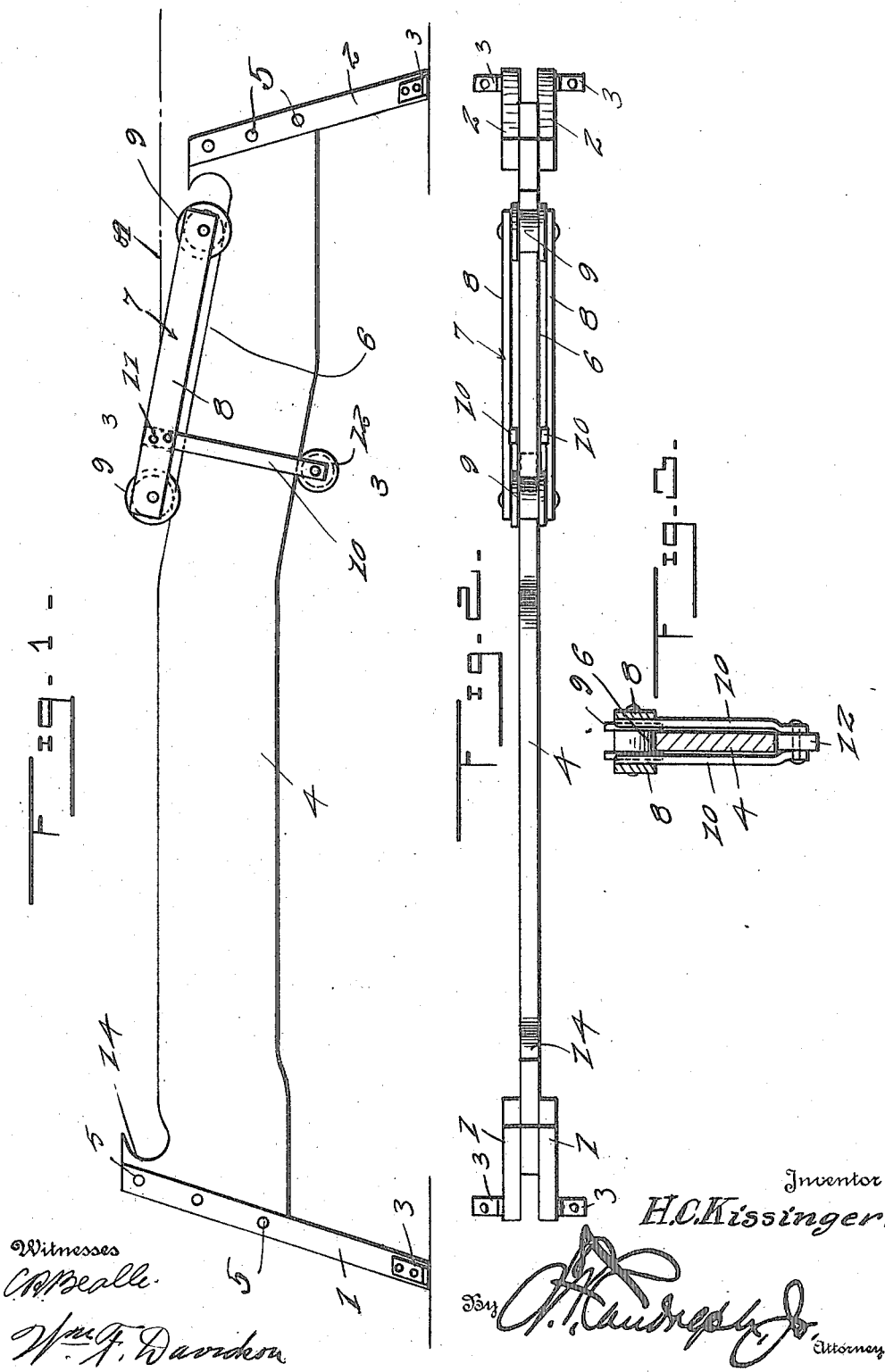

HARRY C. KISSINGER, OF POLK, WISCONSIN.

ROLLER-TRUCK TIRE-SAVER.

1,266,820. Specification of Letters Patent. Patented May 21, 1918.

Application filed April 18, 1917. Serial No. 162,979.

*To all whom it may concern:*

Be it known that I, HARRY C. KISSINGER, a citizen of the United States, residing at Polk, in the county of Washington and State of Wisconsin, have invented certain new and useful Improvements in Roller-Truck Tire-Savers; and I do hereby declare the following to be a full, clear, and exact description of the invention, such as will enable others skilled in the art to which it appertains to make and use the same.

This invention relates to improvements in a roller truck tire saving jack and has for one of its objects the provision of a device of this character, whereby the forward or front end of an automobile or like vehicle may be driven thereupon for the purpose of elevating the front or forward wheels from engagement with the ground, thereby relieving the weight of the automobile or like vehicle upon the tires when the automobile or like vehicle is not being used.

Another object of this invention is the provision of an inclined supporting structure having a truck thereon adapted to be engaged by the front or forward axle of the automobile or like vehicle and upon forward movement of the automobile or like vehicle, the truck moves forward upon the inclined supporting structure elevating the front or forward wheels from engagement with the ground.

A further object of this invention is the provision of means upon the supporting structure for limiting the movement of the truck thereon in the direction of either end thereof to prevent the truck from accidentally disengaging or traveling off of the supporting structure.

A still further object of this invention is the provision of a roller truck tire saver of the above stated character, which shall be simple, durable and efficient, and which may be manufactured and sold at a comparatively low cost.

With these and other objects in view as will become more apparent as the description proceeds, the invention consists of certain novel features of construction, combination and arrangement of parts as will be hereinafter more fully described and claimed.

For a complete understanding of my invention, reference is to be had to the following description and accompanying drawing, in which:

Figure 1 is a side elevation of a roller truck tire saver constructed in accordance with my invention, Fig. 2 is a top plan view of the same, Fig. 3 is a tranverse sectional view taken on the line 3—3 of Fig. 1, illustrating the means for connecting the truck to the supporting structure.

Referring in detail to the drawing, the numerals 1 and 2 indicate forward and rearward supporting members respectively, which are relatively spaced and secured to the flooring by brackets 3. An elongated member 4 is secured between the supporting members 1 and 2 by fasteners 5 and the supporting members 1 are of a greater height than the supporting members 2 so as to support the member 4 in an inclined plane. The rearward end of the member 4 is curved downwardly as shown at 6 for normally supporting a truck 7 in an inclined plane and which will be hereinafter more fully described.

The truck 7 consists of a pair of relatively spaced members 8 having journaled between each end rollers 9, which are adapted to travel upon the upper edge of the member 4. The rollers 9 are of the grooved type so as to receive the upper edge of the member 4 and to be guided thereon by the flanges of the rollers. Downwardly depending and relatively spaced hangers 10 are secured to the members 8 as shown at 11 and have journaled to their lower ends a grooved roller 12, which engages the under or lower edge of the member 4 for retaining the truck 7 upon the member 4.

Each end of the member 4 adjacent its upper edge is provided with curved cut out portions to form stops 14 for limiting the movement of the truck 7 upon the member 4 in either direction, thus preventing the truck 7 from being disengaged from the member 4 during operation.

In operation, when desiring to elevate the forward or front end of an automobile, the automobile is driven upon the truck 7 while the same is in an inclined position as shown in Fig. 1 and engages the truck at a point indicated by the line A and by driving the automobile forwardly, the truck 7 travels upon the member 4, elevating the forward or front wheels of the automobile or like vehicle from engagement with the ground, thus relieving the weight of the automobile from the tires thereon. To remove the automobile from an elevated position on the device, the automobile is driven or propelled in a reverse direction and the truck 7 travels rearwardly upon the member 4 and onto the inclined portion 6, so that the forward or front wheels of the automobile will engage the ground.

While I have shown and described the preferred embodiment of my invention, it will be understood that minor changes in construction, combination and arrangement of parts may be made without departing from the spirit and scope of the invention as claimed.

Having thus described my invention, what I claim is:

A device of the character set forth, comprising a pair of supporting members, and one of said members being of a greater height than the other; an elongated member secured to the supporting members and supported thereby in an inclined position, said elongated member having notches at each end and an inclined portion adjacent one notch, and a truck mounted on the elongated member and adapted to be normally positioned on the inclined portion of said elongated member and to be engaged by an automobile and moved forwardly to engage in the notch adjacent the highest supporting member to raise and hold the automobile in an elevated position.

In testimony whereof I affix my signature in presence of two witnesses.

HARRY C. KISSINGER.

Witnesses:
J. H. TERLINDEN,
ALF. B. FROEHLICH.

Copies of this patent may be obtained for five cents each, by addressing the "Commissioner of Patents, Washington, D. C."